United States Patent [19]

Shibata et al.

[11] Patent Number: 4,805,929
[45] Date of Patent: Feb. 21, 1989

[54] SPRING-CONSTANT VARIABLE TYPE STABILIZER DEVICE

[75] Inventors: Nobuo Shibata, Okazaki; Toshio Suzuki, Anzyo; Takashi Fujii, Okazaki; Junichi Arai; Hisami Kato, both of Kani, all of Japan

[73] Assignees: Mitsubishi Jidosha Kogyo Kabushiki Kaisha; Kayaba Kogyo Kabushiki Kaisha, both of Japan

[21] Appl. No.: 126,831

[22] Filed: Nov. 30, 1987

[30] Foreign Application Priority Data

Dec. 1, 1986 [JP] Japan .................................. 61-286384
Jul. 16, 1987 [JP] Japan .................................. 62-177767

[51] Int. Cl.⁴ .............................................. B60G 19/02
[52] U.S. Cl. .................................... 280/721; 280/700; 280/702
[58] Field of Search ............... 280/688, 695, 700, 718, 280/721, 722, 723, 709, 717, 702

[56] References Cited

U.S. PATENT DOCUMENTS 3,737,173  5/1973  Boissier et al. ..................... 280/721
4,434,998  3/1984  Kaltwasser ........................ 280/721
4,614,358  9/1986  Wymann ........................... 280/721

Primary Examiner—Richard A. Bertsch
Attorney, Agent, or Firm—McGlew and Tuttle

[57] ABSTRACT

The present invention relates to a spring-constant variable type stabilizer device for a vehicle, the device comprising a stabilizer provided between left and right wheels of the vehicle and a control cylinder arranged between the stabilizer and a lower arm, wherein spring constant of the stabilizer is variably adjusted by controlling the control cylinder. An oil port of an oil passage in communication with a reservoir chamber in a position assuming a neutral position of a piston stroke region is formed in a cylinder body of the control cylinder, a piston within the cylinder body is always biased from both directions thereof by means of a pair of springs, and a locked state of the control cylinder is promptly attained always in a complete neutral position.

6 Claims, 6 Drawing Sheets

Fig. 7

SPRING-CONSTANT VARIABLE TYPE STABILIZER DEVICE

BACKGROUND OF THE INVENTION

The present invention relates to a spring-constant variable type stabilizer device which is disposed between left and right wheels of a vehicle.

As is known, a stabilizer mechanism in a suspension system of a vehicle is designed so that opposite ends of a stabilizer are secured to a lower arm through a link rod, and an intermediate portion thereof is rotatably supported on the vehicle body whereby where the left and right wheels of the vehicle are moved up and down in the same phase, a spring action caused by the stabilizer does not occur whilst where the upward and downward movement of the left and right wheels is in the reverse phase, a constant spring force is caused with a central portion of the stabilizer as a torsion bar. At the upward and downward movement of the left and right wheels in the reverse phase, the spring force of the stabilizer is made to act so that a fixed spring force may act with a central portion of the stabilizer as a torsion bar and at the time of upward and downward movement of the left and right wheel in the reverse phase, a phase difference thereof may be corrected thus increasing the rigidity with respect to the roll of the wheels and improve the running stability of the vehicle.

However, if the roll rigidity is reinforced by the stabilizer mechanism, the vibration of the vehicle on the spring increases as the total spring constant of the suspension system increases, and when the vehicle runs on the wavy road surface such that the left and right wheels of the vehicle take the upward and downward movement in the reverse phase, the comfortableness to ride becomes worsened.

In view of the foregoing, as one means for preventing the worsening of the comfortableness to ride, there have been developed a roll control system for the vehicle disclosed, for example, in U.S. Pat. Nos. 2,802,674 and 4,206,935 Specifications.

According to the systems disclosed in said patents, a control cylinder is arranged on the end of a stabilizer whereby when the control cylinder is in an expansible state, a torsional torque of the stabilizer is not transmitted to a lower arm, as a consequence of which when the vehicle runs on the wavy road surface, the vibration of the vehicle on the spring is increased to prevent the worsening of comfortableness to ride on the vehicle.

On the other hand, when the control cylinder is in a locked state to cease the expansion, the torsional torque of the stabilizer is transmitted to the lower arm to effectively prevent the roll of the vehicle during the running of the vehicle on the flat road.

However, in the aforementioned roll control system, the locked state of the control cylinder is not always produced at a neutral position but sometimes the piston stops at a position other than the neutral position. As the result, when the control cylinder is locked, the upper end thereof may not always be maintained at a constant level to bring forth a level difference between the left and right sides of the body, resulting in inconveniences such that the attitude of the vehicle becomes unstable and the running stability may not be secured.

SUMMARY OF THE INVENTION

It is therefore a principal object of the present invention to provide a spring-constant variable type stabilizer device which can prevent an unstable attitude of a vehicle when a control cylinder is locked.

It is a further object of the present invention to provide a spring-constant variable type stabilizer device in which a control cylinder may be promptly and positively returned to its neutral position.

It is another object of the present invention to provide a spring-constant variable type stabilizer in which two operation check valves provided on the control cylinder are simultaneously actuated by a pilot operation to thereby vary a spring constant of the stabilizer.

It is another object of the present invention to provide a spring-constant variable type stabilizer device in which a spring constant of a stabilizer arranged between left and right wheels of the vehicle is made variable, and a produced damping force of a shock absorber provided between the vehicle body and an axle is adjusted to be high or low according to the running condition of the vehicle.

For achieving the aforementioned objects, the present invention provides an arrangement characterized in that upper and lower chambers are defined within a cylinder body constituting a control cylinder by a piston urged in both directions by means of a spring disposed within said cylinder body, operation check valves are disposed in oil passages, respectively, for communicating said upper and lower chambers with a reservoir chamber, said operation check valves being simultaneously opened by a single pilot operation, and an oil port of the oil passage in communication with the reservoir chamber is formed in the cylinder body in a neutral position of a piston stroke region within said cylinder body.

With the above-described arrangement the following function is obtained:

When the control cylinder is in an expansible operating state, the torsional torque in the stabilizer is transmitted toward the lower arm in a state where the spring is compressed within the cylinder to assume a so-called stabilizer soft, whereas when the control cylinder is in a hydraulically locked state, the torsional torque in the stabilizer is transmitted toward the lower arm whereby the rigidity with respect to the roll of the vehicle is increased.

Furthermore, oil flows into the reservoir chamber through the port formed in the cylinder body so as to correspond to the neutral position in the piston stroke region even if the piston within the cylinder body is in a position other than the neutral position when the control cylinder is hydraulically locked. Thus, the piston is returned to its complete neutral position, and upon the return of the piston to the complete neutral position, the aforesaid oil port is closed to bring forth the complete locked state of the control cylinder.

Even if the hydraulic locking operation of the control cylinder is effected in a state other than the neutral of the piston within the cylinder, it is urged from both directions by the spring and therefore the piston is promptly returned to its neutral position interdependently of the communicable state of the control cylinder.

DESCRIPTION OF THE PREFERRED EMBODIMENTS

The present invention will be described hereinafter in connection with the preferred embodiments shown in the accompanying drawings.

Figure 1:
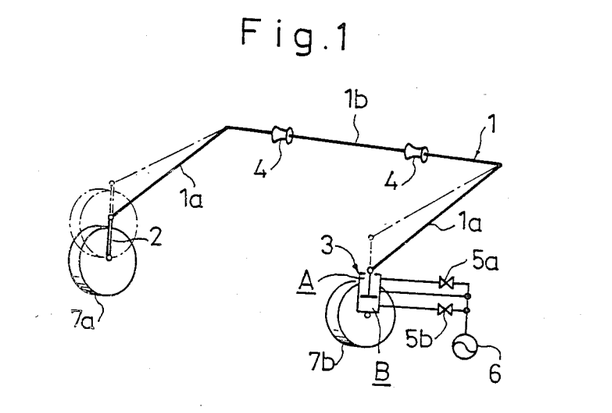
FIG. 1 is a schematic view of a spring-constant variable type stabilizer device according to one embodiment of the present invention.

FIG. 1 shows one embodiment of a stabilizer device according to the present invention. One end of bended arms 1a, 1a of a stabilizer 1 is connected to a lower arm (not shown) as a suspension member through a link rod 2, and a cylinder 3 is disposed on a lower-arm connected portion at the end of the other arm 1a.

It is noted that the control cylinders 3 can be provided on opposite ends so as to increase the stroke of the stabilizer, but the control cylinder will suffice to be arranged on at least one side for achieving the effect of the Present invention.

The stabilizer 1 is rotatably mounted on the vehicle body (not shown) through supports 4 and 4 on the body side disposed on an intermediate portion 1b.

The control cylinder 3 has its upper chamber A and lower chamber B placed in communication with each other through operation check valves 5a and 5b, respectively, the upper and lower chambers A and B being brought into communication with a reservoir chamber 6.

The interior of the control cylinder 3 is communicated with the reservoir chamber 6 through a separate oil passage.

In FIG. 1, 7a designates a right wheel and 7b denotes a left wheel.

Figure 2:
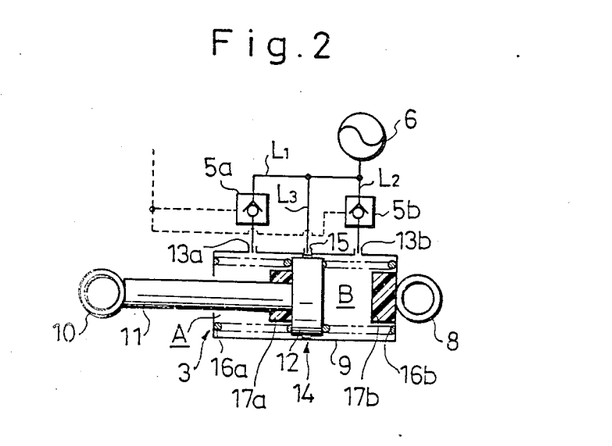
FIG. 2 is a circuit diagram of a control cylinder.

The control cylinder 3 per se will be described. As shown in FIG. 2, a piston 12 associated with a piston rod having a mounting portion 10 to the stabilizer 1 is slidably disposed within a cylinder body 9 having a mounting portion to the lower arm side, and the interior of the cylinder body 9 is defined into an upper chamber A and a lower chamber B.

The cylinder body 9 is formed in inner walls in the vicinity of opposite ends thereof with small holes 13a and 13b, to which are connected oil passages L1 and L2.

An oil port 15 is provided in the inner wall of the cylinder body 9, namely, at a neutral position 14 in an effective stroke region of the piston 12.

When the piston 12 is present in either one of the upper chamber A or lower chamber B within the cylinder body 9, the oil port 15 causes the interior of the cylinder body 9 to be connected with the oil passage L3, which is in turn communicated with the reservoir chamber 6.

The operation check valves 5a and 5b are disposed with the oil passages L1 and L2, and no particular valve is disposed in the oil passage L3.

Within the cylinder body 9 are disposed a pair of springs 16a and 16b, which in turn urge the piston 12 from both directions.

When the piston 12 is in the central position 14, the pair of springs 16a and 16b are balanced.

Accordingly when the operation check valves 5a and 5b are opened and the upper and lower chambers A and B are communicated with each other, the piston 12 causes either of the spring 16a or 16b to be contracted by the loading action of a load on the cylinder body 9 or the piston rod 11, so that the control cylinder 3 may be expanded and contracted.

The operation check valves 5a and 5b each are brought into the open state by mechanical pilot operation to allow a so-called dual flow, and upon release thereof, they serve thereafter as so-called check valves to merely allow a flow in one direction.

In the present embodiment, within the cylinder body 9, stoppers 17a and 17b are respectively disposed on the upper end surface of the piston 12 and the inner bottom surface of the cylinder body 9 to define a significant movement of the piston 12.

According to the present invention constructed as described above, when the operation check valves 5a and 5b are open, the upper and lower chambers A and B in the control cylinder 3 are communicated with each other to assume a so-called free state wherein the movement of the piston 12 is not restricted within the range of the effective stroke thereof.

Therefore, the cylinder body 9 mounted on the Wheel side is moved up and down according to the upward and downward operation of the left wheel 7b of the running vehicle, and as the stabilizer 1 swings upon the upward and downward operation of the other right wheel 7a, the piston 12 mounted on the arm 1a side is moved up and down.

Accordingly, in the open state of the operation check valves 5a and 5b, the stabilizer 1 is operatively connected with the right wheel 7a to assume a so-called stabilizer soft in which the end of the arm 1a swings.

In the piston-free operating state, working oil insufficient in the control cylinder 3 is replenished from the reservoir chamber 6, and conversely, working oil surplus in the control cylinder 3 is absorbed by the reservoir chamber 6.

On the other hand, when the operation check valves 5a and 5b are made to serve as so-called check valves, the upper and lower chambers A and B within the control cylinder 3 are separated from each other, and therefore, the movement of working oil between both the chambers A and B is cut off, as a consequence of which both movements of expansion and pressure sides of the piston 12 assume the locked state.

This brings forth the state of the rigid coupling between the stabilizer 1 and the left and right wheels, and the so-called state of stabilizer action wherein the upward and downward movement of the right wheel 7a and left wheel 7b in the reverse phase generates a torsional torque in the stabilizer.

Where the operation check valves 5a and 5b are to be functioned as the mere check valves by release of the pilot operation, the subsequent movement of the piston 12 within the cylinder body 9 is controlled by the oil port 15 provided at the central position of the cylinder body 9.

That is, for example, when the piston 12 is present in the lower chamber B, working oil in the upper chamber A is absorbed into the reservoir chamber 6 through the oil port 15 upon the withdrawal of the piston rod 11 from the cylinder body 9 caused by repulsion of the spring 16b, and at the same time, working oil insufficient in the lower chamber B is replenished from the reservoir chamber 6 through the operation check valve 5b. When the piston 12 reaches the neutral position 14 in the piston stroke region, the outer periphery of the piston 12 closes the oil port 15 to bring the upper chamber A into a locked state to prevent further movement of the piston 12 and to cease the expansion of the control cylinder 3, thus assuming the locked state.

Also when the piston 12 is present in the upper chamber A, working oil from the reservoir chamber 6 is replenished through the operation check valve 5a in the upper chamber A which undergoes negative pressure by the movement of the piston 12 subjected to repulsion of the spring 16a, and at the same time working oil within the lower chamber B is absorbed into the reservoir chamber 6 through the oil port 15. When the piston reaches the neutral position 14 in the piston stroke region, the outer periphery of the piston 12 closes the oil port 15 to bring the lower chamber B into the oil locked state to prevent further movement of the piston 12 and to cease the expansion of the control cylinder 3, thus assuming the hydraulically locked state.

When the control cylinder 3 is locked at the complete neutral position, the arm 1a of the stabilizer 1 and the lower arm are connected in the so-called rigid state.

Furthermore, according to the present invention, even if the control cylinder should be expanded in a great stroke when the operation check valves 5a and 5b are in the open state, the piston would block the small hole 13a or 13b to bring forth the so-called oil locked state and both the ends of the cylinder body 9 can be avoided from dangers in farthest extension and bottom-out. Even if the piston strokes beyond the limit of the farthest extension and the limit of bottom-out, further farthest extension and bottom-out can be prevented by the stoppers 17a and 17b.

A specific embodiment of the apparatus according to the present invention shown in FIGS. 3 to 5 will be described hereinafter.

Figure 3:
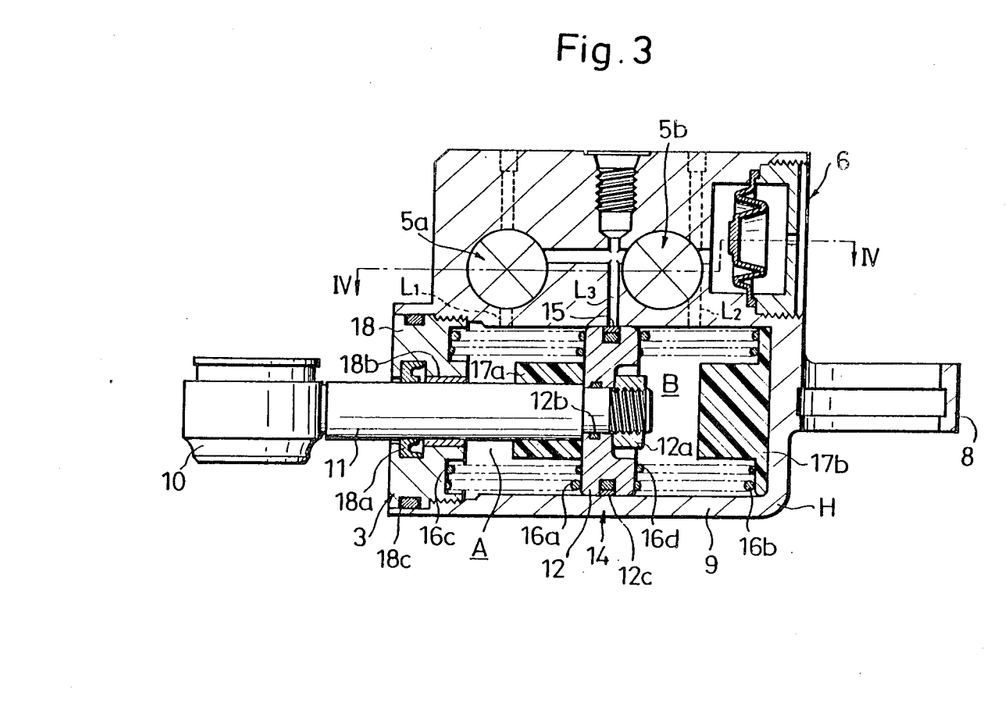
FIG. 3 is a longitudinal sectional view of the control cylinder.

As shown in FIG. 3, the control cylinder and its circuit are integrally formed within a suitable housing H and in the compact form.

That is, the housing H interiorly comprises a control cylinder 3 and two operation check valves 5a, 5b, a reservoir chamber 6, oil passages L1, L2 to allow a communication between the upper and lower chambers A and B within the control cylinder 3 and the reservoir chamber 6, and an oil passage L3 to allow a communication between the interior of the control cylinder 3 and the reservoir chamber 6.

The housing H is partly projected to form a mounting portion 8 to the lower arm in the control cylinder 3.

Within a cylinder body 9 formed in a bottomed cylindrical configuration in a part of the housing H is slidably received a piston 12, the piston 12 defining the interior of the cylinder body 9 into the upper chamber A and the lower chamber B.

The piston 12 is connected to the lower end of a piston rod 11 through a piston nut 12a, and the piston rod 11 has its upper end projected externally on the upper end of the cylinder 9, said projected end having a mounting portion 10 to the stabilizer 1.

The upper end of the cylinder body 9 is closed by applying a cap member 18 thereto, and the piston rod 11 extends through the axis of the cap member 18.

In the inner periphery of the cap member 18 are disposed an oil seal 18a and a bearing 18b, and the inner peripheral surfaces of the oil seal 18a and the bearing 18b are in sliding contact with the outer peripheral surface of the piston rod 11.

An O-ring 18c is disposed on the outer peripheral end of the cap member 18.

A stopper 17b is disposed on the inner bottom surface of the cylinder 9 and a stopper 17a is disposed on the upper end of the piston 12, said stoppers 17a and 17b acting as stroke defining means when the piston 12 is slidably moved at a great stroke.

Within the cylinder body 9 is received a pair of springs 16a and 16b for locating the piston 12 to a neutral position 14 in the piston stroke region within the cylinder body 9, said springs 16a and 16b having a function to urge the piston 12 from both directions thereof.

It will be noted that said pair of springs 16a and 16b can be of a so-called dual construction, and for example, separate springs 16c and 16d are provided internally thereof.

The oil passage L3 is located and bored so that when the piston 12 is at the neutral position 14 within the cylinder body 9, the oil port 15 is closed by the outer periphery of the piston 12.

Disposed in the outer peripheral central portion of the Piston 12 is a piston ring 12c urged by a backup ring 12b, the piston ring 12c closing openings of the oil passages L1 and L2 and the oil port 15.

Figure 4:
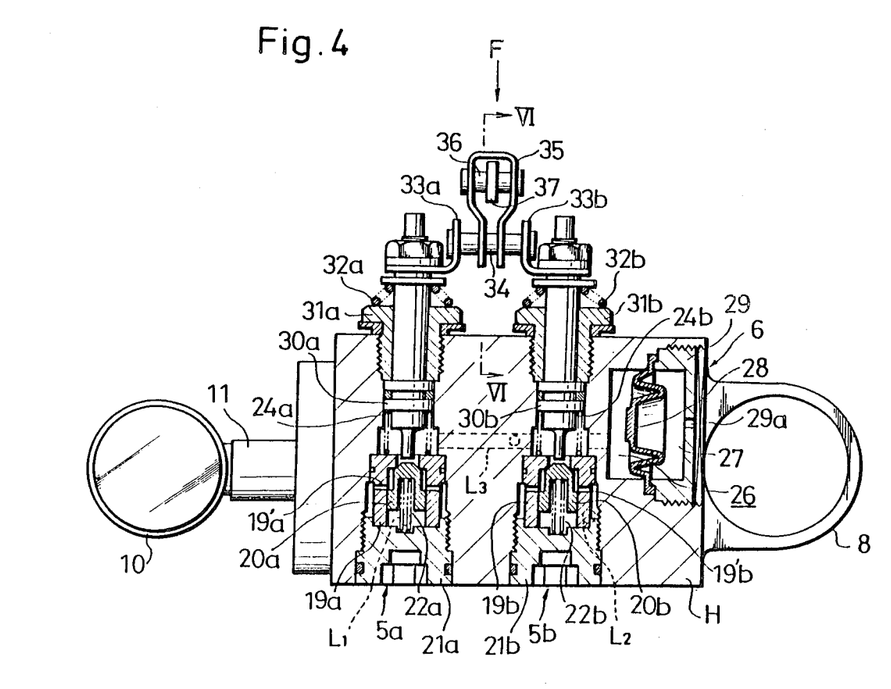
FIG. 4 is a cross-sectional view taken on line IV—IV of FIG. 3.

The operation check valves 5a and 5b are disposed in the intermediate positions of the oil passages L1 and L2, respectively, the operation check valves 5a and 5b being identical with each other and in the form of a so-called poppet valve, as shown in FIG. 4.

More specifically, valve seats 19a and 19b are disposed within the housing H, and vertically movable poppets 20a and 20b are received in the valve seats 19a and 19b so that when the poppets 20a and 20b are closed, an upstream and downstream of the poppets 20a and 20b are cut off from communication therebetween whereas when the poppets 20a and 20b are open, the upstream and downstream of the poppets 20a and 20b are allowed to be communicated therebetween.

The poppets 20a and 20b are urged in the closing position by springs 22A and 22B, respectively.

Push rods 30a and 30b opposed to the poppets 20a and 20b are slidably received in cap a members 31a and 31b threadedly mounted on the housing H and are urged outwardly by means of springs 32a and 32b.

Angle members 33a and 33b are secured to outer ends of the push rods 30a and 30b, respectively, the angle members 33a and 33b being integrally formed so that they may be moved simultaneously by means of a connecting rod 34.

Connected to the connecting rod 34 is a bracket 35, and the end of an operating lever 37 is connected to a pin 36 inserted through the bracket 35.

Figure 5:
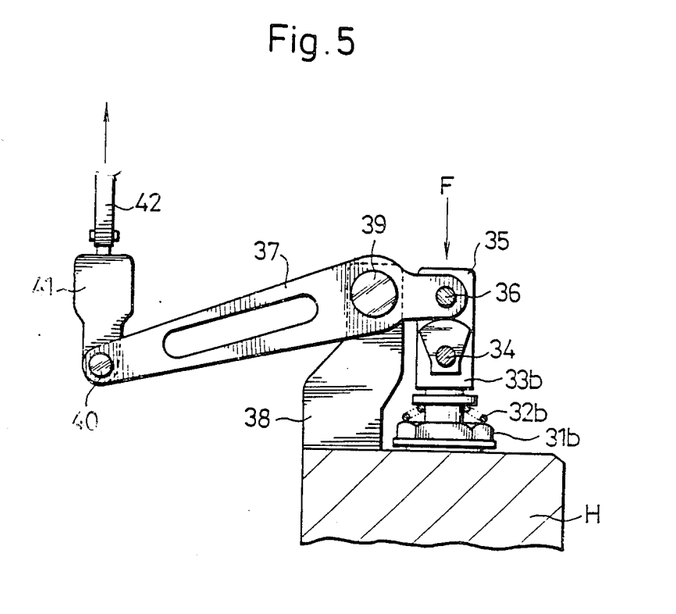
FIG. 5 is a longitudinal sectional view taken on line VI—VI of FIG. 4.

The operating lever 37 is supported through a pin 39 on a bracket 38 attached to the housing H, as shown in FIG. 5, and connected to a connection 41 through a pin 40 inserted therethrough.

Further, a tension material such as a wire is connected to the connection 41, whereby the rear end of the operating lever 37 is rotated by the action of tension applied to the tension material 42.

Accordingly, the operation check valves 5a and 5b has the function as check valves wherein the poppets 20a and 20b assume the open state by virtue of the push rods 30a and 30b which are moved forward by the action of the mechanical tension or artificial force F, and the push rods 30a and 30b are withdrawn upon release of the tension F whereby the poppets 20a and 20b are closed to form the oil passages L1 and L2 into unidirectional flow-passages.

Figure 6:
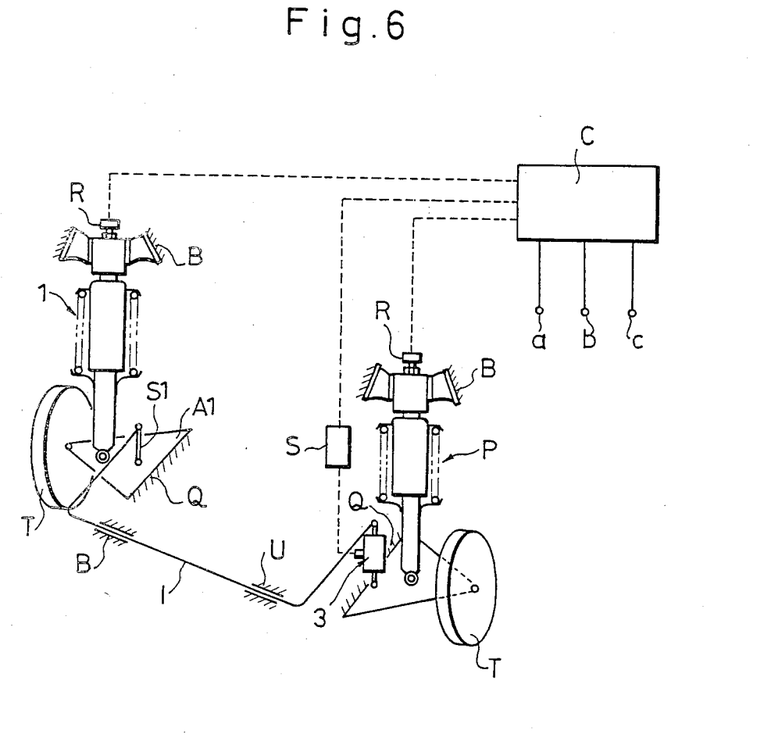
FIG. 6 is a schematic view of a spring-constant variable type stabilizer device according to another embodiment of the present invention.
Figure 7:
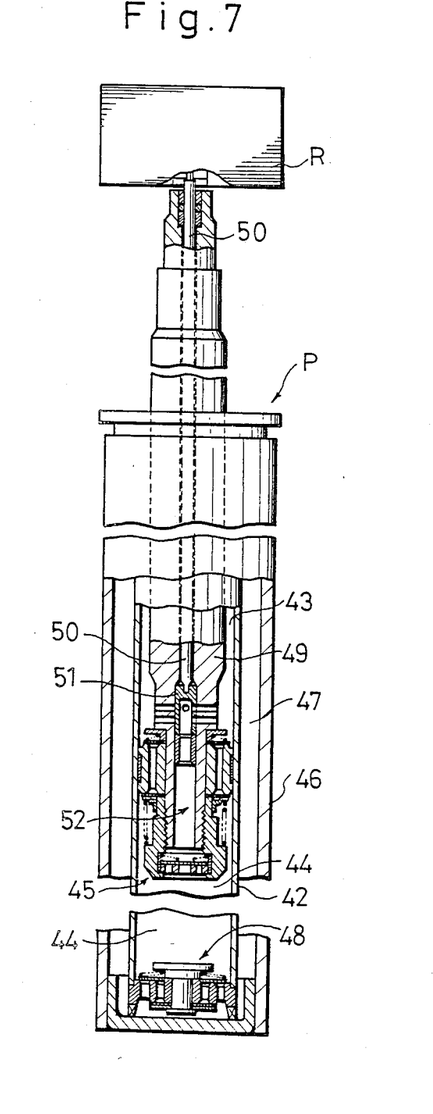
FIG. 7 is a partly cutaway longitudinal sectional view of a shock absorber.

FIGS. 6 and 7 show another embodiment of the present invention. In this embodiment, a shock absorber is provided in addition to the aforementioned stabilizer device.

A suspension control device according to the present embodiment is realized by a suspension construction designed as shown in FIG. 6, which suspension construction comprises a shock absorber P disposed between the body side B for four wheels of the vehicle and the axle side A, a stabilizer 1 disposed between left and right wheels T of the vehicle, and a control cylinder 3 disposed between one end of the stabilizer 1 and a lower arm Q. The shock absorber P is varied in its produced damping force by actuation of an actuator R, and the control cylinder 3 is designed so that hardness and softness of the roll rigidity is adjusted by actuation of an actuator S.

The shock absorber P is sufficient if the former may effect a predetermined damping action when it is expanded and contracted. Although not specifically limited, the shock absorber is formed as shown in FIG. 7, for example.

That is, in this shock absorber P, a piston portion 45, which defines the interior of a cylinder 42 into a rod-side oil chamber 43 and a piston-side oil chamber 44, is slidably received in the cylinder 42; an outer tube 46 is provided outwardly of the cylinder 42; and a reservoir chamber 47 is provided between the outer tube 46 and the cylinder 42, the reservoir chamber 47 being communicated with the piston-side oil chamber 42 through a base valve portion 48 disposed on the inner bottom at the lower end of the cylinder 42.

When the piston portion 45 is moved up and down within the cylinder 42, a predetermined extension-side damping force and a predetermined pressure-side damping force are produced by the piston portion 45 and the base valve portion 48, respectively.

A piston rod 49 has the piston portion 45 located at the lower end thereof, the upper end of which is projected outside from the upper end of the cylinder 42, and a control rod 51 is rotatably inserted through the axis thereof.

A rotary valve 51 is provided on the lower end of the control rod 51, the rotary valve 51 being rotatably received in a passage 52 interiorly formed from the lower end of the piston rod 49 to a position near the lower end so that the rod-side oil chamber 43 may be communicated with the piston-side oil chamber 44.

The upper end of the control rod 51 is projected outside from the upper end of the piston rod 49, and the aforesaid actuator R is connected to the upper end of the control rod 49.

It is of course that the rotary valve 51 controls, when it rotates, a drawing resistance of oil passing through the passage 52.

Accordingly, when the piston portion 45 is moved up and down within the cylinder 42, the actuator R causes the drawing resistance of working oil passing through the passage 52 to be varied to vary the magnitude of the extension-side damping force produced in the piston portion 45 or the pressure-side damping force produced in the base valve portion 48, whereby the damping effect at the time of expansion of the shock absorber P may be controlled freely according to the running condition of the vehicle or a desire of an operator.

The operation and selection of the operation of the actuator R in the shock absorber P are accomplished by a command signal from a controller C. Signals input into the controller C include a selection signal a by manual operation, a detection signal b from a vehicle-speed sensor as detection means, a detection signal from a steering-wheel angle sensor as detection means, and the like (see FIG. 6).

Accordingly, for example, when the selection signal which makes so-called "hard" the produced damping force, is input into the controller C by manual operation according to the desire of the vehicle driver, the produced damping force in the shock absorber P is formed into a high damping force to enhance the running properties when the vehicle runs on the unpaved road.

When the selection signal a, which makes the produced damping force so-called "soft", is input into the controller C, the produced damping force in the shock absorber 1 is formed into a low damping force to allow the comfortableness to ride when the vehicle runs on the flat road to take preference.

Even when any of said selection signal a is being input manually into the controller C, when for example, the vehicle is suddenly turned to bring forth the roll phenomenon, the detection signals b and c from the vehicle speed sensor and the steering wheel sensor are input into the controller C, the produced damping force of the shock absorber P is controlled to be high and low, and the aforesaid roll phenomenon, that is, the attitude of the vehicle is controlled.

Likewise the FIG. 1 embodiment, the control cylinder of the stabilizer is disposed between one end of the stabilizer provided between the left and right wheels T of the vehicle and a lower arm Q of the vehicle whereby upon the actuation of the actuator S connected to the control cylinder 3, the right or wrong of the expansion thereof is selected.

The other end of the stabilizer 1 is connected to the lower arm Q of the vehicle through a link rod S1, and the intermediate portion of the stabilizer 1 is connected to a body side U of the vehicle.

The operation and selection of the operation of the actuator S in the control cylinder 3 are accomplished by a command signal from the controller C in a manner similar to the actuation of the actuator R in the shock absorber 1 but can also be manually accomplished. The operation and effect of the control cylinder 3 are the same as those of the FIG. 1 embodiment.

According to the embodiment shown in FIG. 6, the produced damping force of the shock absorber disposed between the axle side for four wheels of the vehicle and the body side is adjusted to be high or low, and the roll rigidity of the stabilizer disposed between the left and right wheels of the vehicle is selected to be hard or soft. Therefore, there is a merit that controlling can be made according to the running condition of the vehicle to improve the comfortableness to ride and operating stability of the vehicle.

As described above, according to the present invention, the upper and lower chambers within the control cylinder are communicated with each other through the passage and communicated with the reservoir, and the operation check valve is disposed in each oil passage. Therefore, the hard or soft, namely, the spring constant of the stabilizer is made variable merely by opening and closing the operation check valve, and the attitude of the vehicle according to the condition of the running road surface of the vehicle may be attained.

Further, according to the present invention, even one operation, that is, one pilot operation from a mechanical tension or an artificial force, two operation check valves can be opened at the same time, bringing forth the advantage that no so-called delay in operation occurs.

Moreover, according to the present invention, when the locked state of the control cylinder is desired to be brought forth, the locked state of the control cylinder can be always brought forth quickly in the complete neutral position to rapidly stabilize the attitude of the vehicle.

We claim:

1. In a stabilizer device provided with a control cylinder so that a torsional rigidity of the stabilizer disposed so as to generate a torsional torque according to upward and downward operation of left and right wheels of a vehicle is made variable, a spring-constant variable type stabilizer device, characterized in that a piston is slidably inserted into a cylinder body constituting a control cylinder, said piston being urged from both directions thereof by means of a pair of springs disposed on said cylinder body and defining the interior of the cylinder body into an upper chamber and a lower chamber, operation check valves are disposed in oil passages, respectively, for communicating said upper and lower chambers with a reservoir chamber, said operation check valves each being formed to be opened simultaneously by one pilot operation, and an oil port of an oil passage in communication with the reservoir chamber is formed in said cylinder body in a neutral position of a piston stroke region within said cylinder body so that locking of the piston is only possible when the piston is in the neutral position.

2. A spring-constant variable type stabilizer device according to claim 1, wherein the pilot operation is carried out by utilization of an artificial force such as tension.

3. A spring-constant variable type stabilizer device according to claim 1, wherein the operation check valve has a poppet opposed to a push rod, and at the time of mechanical pilot operation, the push rod moves forward to withdraw the poppet.

4. A spring-constant variable type stabilizer device according to claim 1, in a stabilizer device provided with a control cylinder so that a torsional rigidity of the stabilizer disposed so as to generate a torsional torque according to upward and downward operation of left and right wheels of a vehicle is made variable, wherein in addition to said control cylinder, a shock absorber which makes a produced damping force variable by actuation of an actuator is disposed between a body side of a vehicle and a suspension member, the actuator for said shock absorber being individually actuated by a command signal from a controller, and a selection signal caused by manual operation and detection signals from detection means such as a vehicle speed sensor, a steering wheel angle sensor and the like are input into the controller.

5. In a stabilizer device provided with a control cylinder so that a torsional rigidity of the stabilizer disposed so as to generate a torsional torque according to upward and downward operation of left and right wheels of a vehicle is made variable, a spring-constant variable type stabilizer device characterized in that a piston is slidably inserted into a cylinder body constituting a control cylinder, said piston being urged from both directions thereof by means of a pair of springs disposed on said cylinder body and defining the interior of the cylinder body into an upper chamber and a lower chamber, operation check valves are disposed in oil passages, respectively, for communicating said upper and lower chambers with a reservoir chamber, said operation check valves each being formed to be opened simultaneously by one open- and closing operating actuator, an oil port of an oil passage in communication with the reservoir chamber is formed in said cylinder body assuming a neutral position of a piston stroke region within said cylinder body so that locking can be made only in the neutral position, and in addition to said control cylinder, a shock absorber which makes a produced damping force variable by actuation of an actuator is disposed between a body side of a vehicle and a suspension member, said shock absorber and each of actuators of said control cylinder being individually actuated by a command signal from the controller, and a selection signal caused by manual operation and detection signals from detection means such as a vehicle speed sensor, a steering-wheel angle sensor and the like are input into the controller.

6. A stabilizer for left and right wheels of a vehicle of the kind provided with a control cylinder device for varying the torsional rigidity of a stabilizing element, the control cylinder device comprising:

a piston slidably received in a cylinder body so as to divide said body into first and second fluid receiving chambers; resilient biasing means on said body arranged to engage the piston to bias the piston into a neutral position in the cylinder body;

a fluid reservoir chamber;

first and second fluid passages opening to the cylinder body at spaced apart locations on opposite sides of the piston thereby to connect respective first and second chambers with the reservoir chamber;

first and second check valves in respective of said passages;

means to open both said check valves simultaneously to permit fluid flow therethrough in both directions thereby to enable effective fluid communication between the first and second chambers;

a third fluid passage extending between the reservoir and the cylinder body and having an opening connected to the cylinder body at the neutral position and between the openings of the first and second passages whereby the piston will close such opening when adopting the neutral position so that the piston can be locked by fluid confined in the respective chambers by the check valves only when the piston is in the neutral position.

* * * * *